United States Patent [19]

Ingber

[11] 4,162,373
[45] Jul. 24, 1979

[54] FLEXIBLE ACOUSTIC COUPLER

[75] Inventor: Jack F. Ingber, San Diego, Calif.

[73] Assignee: Systems Consultants, Inc., Washington, D.C.

[21] Appl. No.: 920,612

[22] Filed: Jun. 29, 1978

[51] Int. Cl.² ........................................... H04M 11/00
[52] U.S. Cl. .................................................... 179/1 C
[58] Field of Search .............................. 179/1 C, 2 C

[56] References Cited

FOREIGN PATENT DOCUMENTS 1105542  7/1955  France ...................................... 179/1 C

OTHER PUBLICATIONS

"Wallet Terminal Keyboard with Acoustic Coupler", M. F. Davis, Jr. et al., IBM Tech. Disclosure Bul., vol. 10, No. 3, Aug. 1967, pp. 188–189.

Primary Examiner—Kathleen H. Claffy
Assistant Examiner—Kenneth A. Chayt
Attorney, Agent, or Firm—Pollock, Vande Sande & Priddy

[57] ABSTRACT

A flexible acoustic coupler includes a pair of muffs and at least one acoustic-electrical transducer located in one of the muffs. Each of the muffs is arranged to support either the mouthpiece or earpiece of a conventional telephone handset. The muffs, in turn, are joined by a flexible coupling element which normally supports the muffs spaced apart so as to be mated in acoustic coupling relation with a conventional telephone handset. The flexible coupling element, however, is capable of flexing so that one muff can be rotated 180° with respect to the other muff and mated therewith to thereby reduce the space taken up by the coupler when not operating. In implementation, the flexible coupling element and both muffs are integrally molded providing an attractive and efficient low cost acoustic coupler.

11 Claims, 7 Drawing Figures

FLEXIBLE ACOUSTIC COUPLER

FIELD OF THE INVENTION

The present invention relates to an acoustic coupler for coupling electrical signals to and/or from a conventional telephone handset.

BACKGROUND OF THE INVENTION

As the popularity of transmitting information over the telephone lines has grown, the need for devices to couple apparatus to and from the telephone transmission lines has also grown. While it is possible to electrically couple information sources and sinks to the telephone lines, in many states that access is prohibited or limited by regulation, and, in any event, a much simpler coupling arrangement is available. Thus, the popularity of acoustic couplers, employing a conventional telephone handset, has by far become the most popular method of coupling information to and from the telephone lines.

Indeed, many information handling devices are manufactured which include an acoustic coupler so that information may be coupled from or to the device and the telephone lines by simply inserting a conventional telephone handset into the acoustic coupler. While these prior art devices work quite well in their intended environment, there is a need for improvement.

A major problem is the space taken up by the acoustic coupler. With the advent of LSI devices and the commensurate shrinkage of the data source or sink, the space required by the acoustic coupler has become embarrassingly large. Indeed, in some cases, the acoustic coupler takes up a larger space than that occupied by the data source or sink.

Davis, in U.S. Pat. No. 3,992,583 has attempted to overcome this problem by providing an acoustic coupler which protrudes from the associated data source/sink.

The Davis arrangement minimizes the effect of coupler volume by locating the coupler exterior to the electronics package. This is only a partial solution and when the Davis coupler is not in use its size may overshadow the size of the electronics package. Furthermore, the information source/sink with which the Davis acoustic coupler is connected, is relatively larger than the acoustic coupler itself. In other applications, for example, in a hand-held data storage device, the volume penalty required by employing the Davis type coupler would be excessive.

Therefore, it is an object of the invention to provide an acoustic coupler which is a stand alone device, connected to a data source or sink only by electrical connections. It is another object of the invention to provide such a coupler which, while being an integral molded component, can be folded or compacted when the coupler is not in use. It is another object of the present invention to provide an acoustic coupler having a relatively conventional configuration when in use, i.e., including a pair of muffs joined together but which provides a flexible joint so that the coupler can be folded on itself to thereby reduce the space occupied by the coupler when not in use. It is still another object of the invention to provide such a coupler which may include active elements, for example, a preamplifier, so that the length of an electrical connection, and shielding thereof, between the acoustic coupler and a data source/sink is not critical. Other objects and advantages of the invention will appear from the following description.

SUMMARY OF THE INVENTION

These and other objects of the invention are met by the acoustic coupler disclosed herein which comprises at least one acoustical-electrical transducer, a pair of muffs, each adapted for acoustic coupling relation with a receiver or mouthpiece of a conventional telephone handset, and a flexible joining element interconnecting the muffs allowing the acoustic coupler to take on a conventional configuration when in use, but also allowing the acoustic coupler to be folded on itself to thereby substantially reduce the space occupied by the acoustic coupler when not in use.

The pair of muffs and the flexible joining element can be integrably molded with the flexible joining element molded to allow ready folding or bending. Preferably the coupler includes two transducers, a microphone and speaker and may further include at least one active element such as a preamplifier. The flexible joining element can be hollow so electrical conductors can pass therethrough from one muff to the other.

One of the pair of muffs includes an inwardly tapering inner wall and the other muff includes an outwardly tapering outer wall. The diameters of inwardly and outwardly tapering walls are commensurate allowing the muffs to telescope when the joining element is folded.

BRIEF DESCRIPTION OF THE DRAWINGS

The inventions will now be described so as to enable any person skilled in the art to make and use the same in connection with the attached drawings in which like reference numerals identify identical apparatus and in which.

DETAILED DESCRIPTION OF PREFERRED EMBODIMENTS

Figure 1:
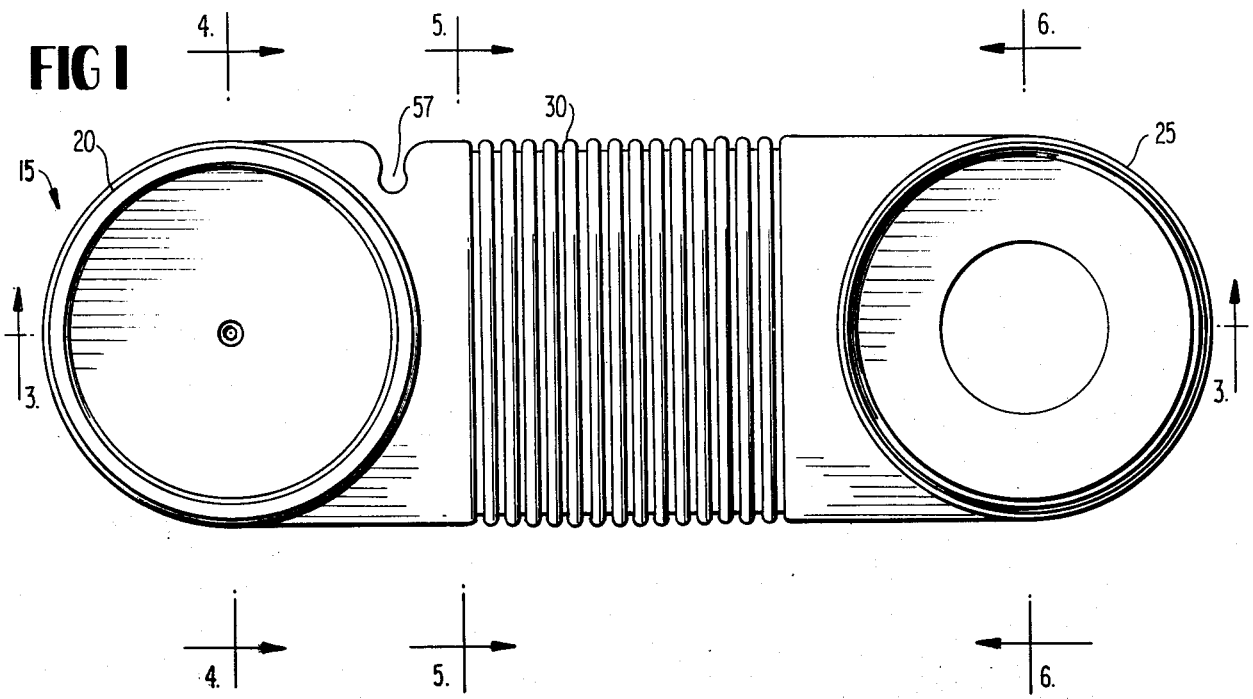
FIGS. 1 and 2 are top and bottom views of the coupler.
Figure 2:
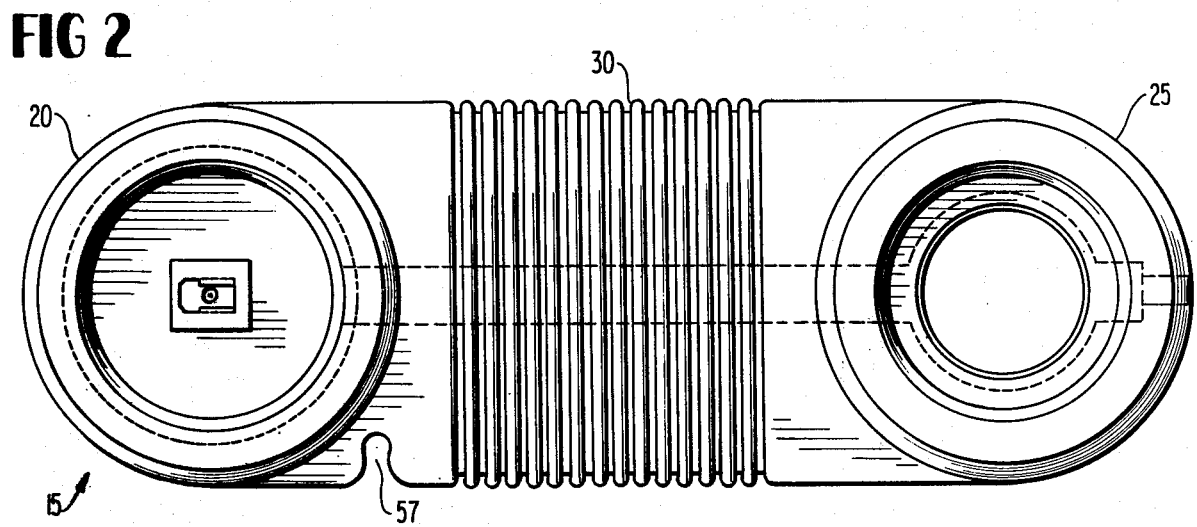

FIGS. 1 and 2 are top and bottom views, respectively, of the acoustic coupler 15. The acoustic coupler 15 comprises a pair of muffs, a first muff 20 and a second muff 25. Each muff is of generally circular cross-section and includes a mouth piece or earpiece mating portion for at least supporting and preferably receiving the mouthpiece or earpiece of a conventional telephone handset, respectively. Connecting the muffs 20 and 25 is a flexible interconnection 30; the muffs and interconnection are preferably an integral unit molded of a material which, in a preferred embodiment, is EPDM, also known as "crackless rubber." The use of this material is not essential to the invention, and preferred alternatives include neoprene or even natural rubber. The inner diameter of the mouthpiece or earpiece mating portions of the muffs 20 and 25 are preferably selected so that the conventional earpiece or mouthpiece can be received therein. The center to center distance between the muffs 20 and 25 is selected to match that of the conventional telephone handset. The various components of the muffs as well as the interconnection element, are illustrated in more detail in FIG. 3 which comprises a section of FIG. 1 taken on the lines 3—3.

Figure 3:
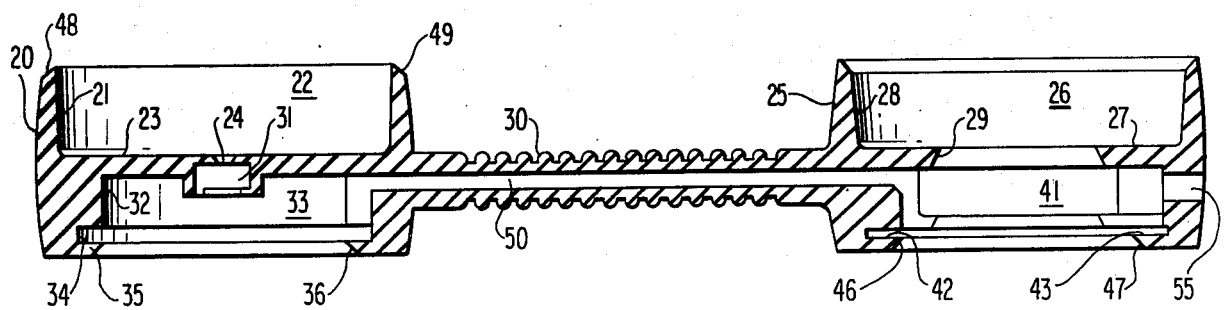
FIG. 3 is a cross-section taken on the line 3—3.

As shown in FIG. 3, the muff 20 includes a generally cylindrical, although slightly bulging, outer wall. The earpiece mating portion 22 of the muff 20 is bounded by a generally cylindrical although tapering inward, wall 21 and a floor 23. The floor 23 includes a conical hole 24 therein communicating with a microphone compartment 31. The dimensions of the microphone compartment 31 can be varied to suit a selected microphone within relatively wide variations. Also included in the muff 20 beneath the floor 23, bounded by the lower surface of the floor 23 and portions of the microphone compartment 31, and by generally cylindrical walls 32, is a circuit board compartment. The muff 20 includes, below the circuit board compartment 33, a recess 34 and a lower lip 35 and 36 which, as illustrated, have radially outwardly tapering edges. The interconnection element 30 includes a corrugated, or ridged, outer surface and is hollow providing a communicating path to the circuit compartment 33 in the muff 20.

The mouthpiece mating muff 25 includes a mouthpiece mating portion 26 which is bounded by a floor 27, generally cylindrical, although slightly tapering inward, walls 28 which tapers outwardly at a point near the mouthpiece receiving entrance at a greater angle than that of the wall 28. The floor 27 also includes a hole therein with radially outward and downwardly tapering wall 29. Located below the floor 27 and communicating with the mouthpiece receiving portion 26 through the hole formed by the walls 29 in the floor 27, is a speaker compartment 41, bounded by generally cylindrical walls. The generally cylindrical walls in the speaker compartment 41 include a slot of radius greater than the radius of the walls to provide shoulders 42 and 43. The speaker compartment 41 communicates with the circuit compartment 33 through the hollow portion of the connecting element 30. A further hole in the wall of the muff 25 communicates exteriorly of the muff 25. Finally, radially outwardly and downwardly tapering edges 46 and 47 extend to the outer surfaces of the muff 25.

The radius and taper of the upper extremity of the walls 28 of the muff 25 are selected so as to match the radius and taper of the exterior wall 48, 49 of muff 20.

Figure 4:
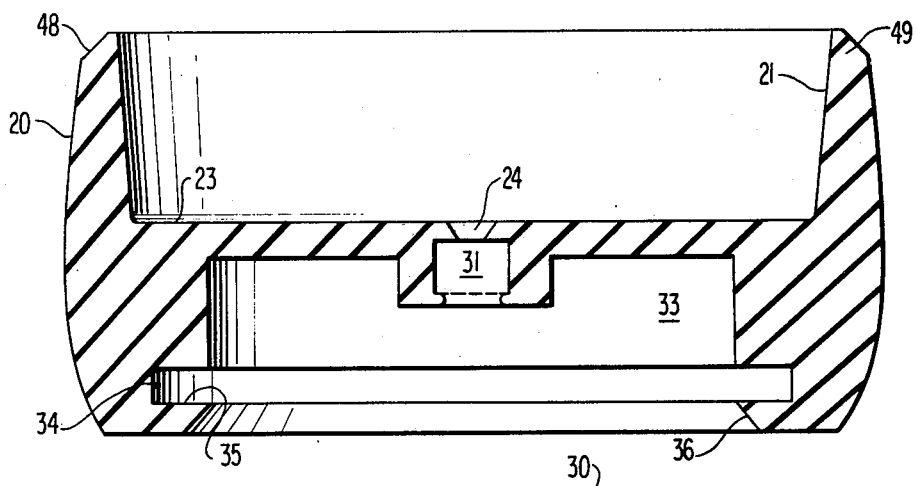
FIGS. 4, 5 and 6 are, respectively, cross-sections taken on the lines 4—4, 5—5 and 6—6.

FIG. 4 is a cross-section of the muff 20 taken on lines 4—4. The exterior taper at the earpiece receiving portion of the muff 20 is shown at 48 and 49.

Figure 5:
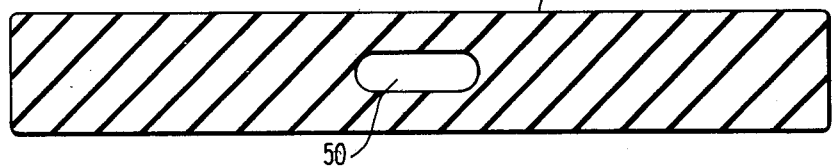
Figure 6:
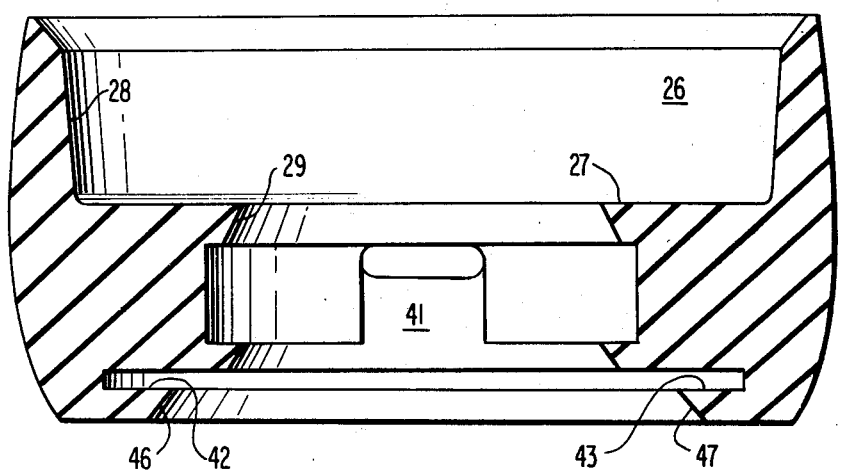

FIG. 6 is a cross-section of the muff 25 taken on the lines 6—6 and illustrates the configuration of the muff already described in connection with FIGS. 1 and 3. FIG. 5 is a cross-section of the connection element 30 taken on the line 5—5 and illustrates the hollow conduit 50 contained therein providing communication between the circuit compartment 33 and the speaker compartment 41, in the muffs 20, 25, respectively.

In use, the acoustic coupler takes a configuration which is as is shown in FIGS. 1 to 3. In addition to the integral coupler referred to herein, an acoustic-electric transducer such as a microphone may be located in the microphone compartment 31. The compartment 33 may include an active circuit comprising a preamplifier and a housing disc may be located in the slot 34 and supported by the shoulders at the lower edge of the muff 20. Likewise, a conventional speaker may be included within the speaker compartment 41 and a housing disc may be located in the slots in the muff 25 to be supported on the shoulders 42 and 43. These discs can be formed of any convenient material, i.e. plastic or metal, and serve to seal the compartments 41 and 33. Electrical connections from the microphone located in the microphone compartment 31 can be made to a preamplifier in the circuit compartment 33. This preamplifier can take any one of a number of forms including for example, a printed circuit card with discrete components or an MSI or LSI chip. In any event, an electrical connection to the preamplifier is run through the conduit 50 and out the aperture 55 in the muff 25. Likewise, electrical connections for driving the speaker 41 may also be conducted through the aperture 55 to be connected to external equipment such as a data source/sink.

Those skilled in the art readily have available to them particular elements such as transducers, which may take the form of microphones, speakers, and other components such as preamplifiers which may be located within the circuit compartment 33. Accordingly, a disclosure of these elements is not deemed necessary herein for a complete understanding of the invention.

As thus assembled, the acoustic coupler is capable of coupling information from a data source through the electrical connections to a transducer such as speaker 41 which converts the information to acoustical signals which are received by the mouthpiece of a conventional telephone handset which is mated with, supported or received within the muff 25. In a conventional fashion, the information is coupled in turn to the telephone system from which it is available over a previously established connection to a remote location. Likewise, the remote location can couple information to the telephone system and from thence to the earpiece of a conventional telephone handset which is supported by or received within the muff 20. The acoustical signals thus coupled are received by the microphone located in the microphone compartment 31 and converted to electrical signals which may be amplified by the preamplifier located in the circuit compartment 33. The output of the preamplifier located in the circuit compartment 33 can thence be coupled to the electrical conductors located within the conduit 50 of the interconnection element 30 and from thence through the aperture 55 to a data sink which may be a conventional hand held data terminal.

Figure 7:
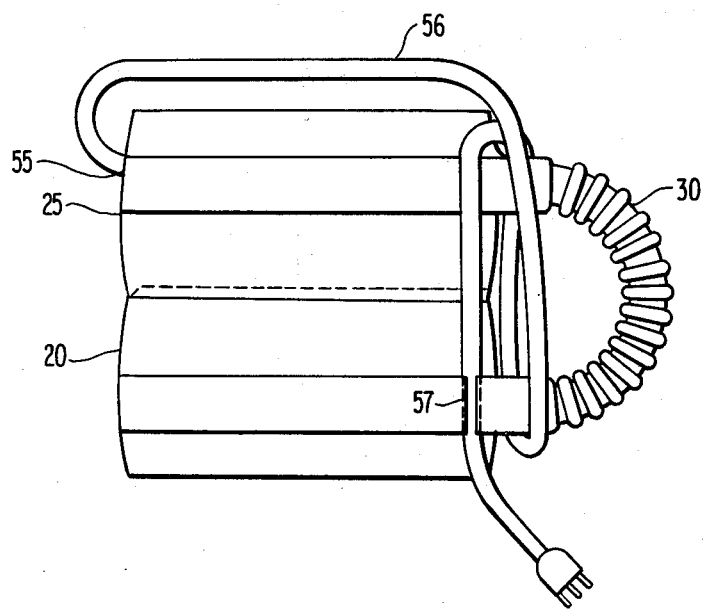
FIG. 7 is a view of the coupler when not in use and folded on itself.

When not in use, the space occupied by the acoustic coupler can be severely reduced by merely folding the coupler such that the inwardly tapering inner wall of the muff 25 encompasses the outwardly tapering outer wall of the muff 20, much as is illustrated in FIG. 7, which shows the coupler in its stored or non-operative condition with the muffs telescoped together. It should be apparent from FIG. 7 that the coupler, in the configuration of FIG. 7 is in a much more compact form than the form exhibited when the coupler is in its operative configuration. To aid in maintaining the coupler 15 in its folded condition the electrical cable 56 may be wrapped around the element 30, as shown, and then insert within a slot 57, cut for that purpose in the element 50.

What is claimed is:

1. An acoustic coupler for housing at least one acoustic-electrical transducer and for supporting a telephone handset in acoustically coupled relationship to said at least one transducer, said coupler comprising:

first and second muff means each for supporting an ear or mouthpiece of said telephone handset, at least one of said muff means housing said at least one acoustic-electrical transducer, flexible joining means joining said muff means, so that said muff means assume, at any one time, one of at least two positions relative to each other, a first relative position in which said muff means are separated by a distance corresponding to earpiece-mouthpiece separation of said handset, and a second relative position in which said muff means are directly adjacent each other.

2. The coupler of claim 1 in which a first one of said muff means includes handset supporting means and an outwardly tapering outer wall adjacent said handset supporting means and in which said second one of said muff means includes a handset supporting means and an inwardly tapering inner wall adjacent said handset supporting means.

3. The coupler of claim 2 wherein outside dimensions of said outwardly tapering outer wall correspond to inner dimensions of said inwardly tapering inner wall whereby said first and second muff means are engageable in telescoping relation.

4. The coupler of claim 1 in which said flexible joining means comprises a ridged hollow arm adapted to rotate a one of said muff means through approximately 180° of rotation with respect to another of said muff means.

5. The coupler of claim 1 which includes a pair of acoustic-electrical transducers, each in a different one of said muff means.

6. The coupler of claim 1 which includes at least one active electrical circuit in at least one of said muff means.

7. The coupler of claim 1 in which each said muff means includes an inwardly tapering inner wall for receiving a one of a mouthpiece or earpiece of a telephone handset.

8. The coupler of claim 1 in which said first and second muff means and said flexible joining means are integral.

9. An acoustic coupler comprising a pair of muff means each for acoustic coupling with a telephone handset and means joining said muff means for folding movement to bring said muff means into adjoining relation.

10. The coupler of claim 9 in which said muff means include a first inner wall of a first muff means of diameter decreasing from an outer edge to form a tapering inward inner wall and outer wall of a second muff means of diameter increasing from an outer edge to form a tapering outward outer wall.

11. The coupler of claim 10 in which said diameter of said inner wall is commensurate with said diameter of said outer wall whereby when said means joining said muff means is folded said muff means are brought into telescoping relation.

* * * * *